US008478741B2

(12) United States Patent
Santosuosso (10) Patent No.: US 8,478,741 B2
(45) Date of Patent: *Jul. 2, 2013

(54) AUTONOMIC REFRESH OF A MATERIALIZED QUERY TABLE IN A COMPUTER DATABASE

(75) Inventor: John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1047 days.

This patent is subject to a terminal disclaimer.

(21) Appl. No.: 11/953,050

(22) Filed: Dec. 9, 2007

(65) Prior Publication Data

US 2008/0097962 A1    Apr. 24, 2008

Related U.S. Application Data

(62) Division of application No. 11/197,607, filed on Aug. 4, 2005.

(51) Int. Cl.
*G06F 7/00* (2006.01)

(52) U.S. Cl.
USPC .......................................................... 707/717

(58) Field of Classification Search
USPC .................... 707/713, 715, 717, 719, 720
See application file for complete search history.

(56) References Cited

U.S. PATENT DOCUMENTS

| 5,202,993 A * | 4/1993 | Tarsy et al. ................ 717/152 |
|---|---|---|
| 5,758,146 A | 5/1998 | Schiefer et al. |
| 6,026,390 A | 2/2000 | Ross et al. |
| 6,125,360 A | 9/2000 | Witkowski et al. |
| 6,134,543 A | 10/2000 | Witkowski et al. |
| 6,275,818 B1 | 8/2001 | Subramanian et al. |
| 6,334,128 B1 | 12/2001 | Norcott et al. |
| 6,542,964 B1 | 4/2003 | Scharber |
| 6,546,402 B1 | 4/2003 | Beyer et al. |
| 6,708,179 B1 | 3/2004 | Arora |
| 6,799,251 B1 * | 9/2004 | Jacobs et al. ................... 711/133 |
| 6,847,962 B1 | 1/2005 | Cochrane et al. |
| 6,882,993 B1 * | 4/2005 | Lawande et al. .............. 707/714 |
| 7,007,006 B2 * | 2/2006 | Zilio et al. ..................... 707/717 |
| 7,124,146 B2 | 10/2006 | Rjaibi et al. |
| 7,158,994 B1 * | 1/2007 | Smith et al. .................... 707/717 |
| 7,203,685 B2 | 4/2007 | Abdo et al. |
| 7,343,366 B2 | 3/2008 | Miao et al. |
| 7,734,602 B2 | 6/2010 | Folkert et al. |

(Continued)

OTHER PUBLICATIONS

Embry, et al., "Automated Summary Tables and Aggregate Navigation in DB2," The IDUG Solutions Journal, Fall 1999, vol. 6, No. 3.

(Continued)

*Primary Examiner* — Hung T Vy
(74) *Attorney, Agent, or Firm* — Martin & Associates LLC; Bret J. Petersen (57) ABSTRACT

A method autonomically refreshes a materialized query table (MQT) in a computer database to improve database performance and utility. In preferred embodiments, the query optimizer autonomically initiates a refresh of MQT depending on an estimated time for the query to access the base tables. In other preferred embodiments, the query optimizer estimates the time for the query to access the base tables and compares it to the estimated time to refresh the MQT to determine whether to refresh the MQT and run the query over the MQT rather than the base tables.

3 Claims, 5 Drawing Sheets

U.S. PATENT DOCUMENTS

| | | |
|---|---|---|
| 7,783,625 B2 | 8/2010 | Simmen |
| 7,890,491 B1 | 2/2011 | Sinnem |
| 7,890,497 B2 | 2/2011 | Folkert et al. |
| 7,895,186 B2 | 2/2011 | Yu |
| 7,912,834 B2 | 3/2011 | Gupta et al. |
| 7,930,297 B2 | 4/2011 | Yu et al. |
| 8,103,689 B2 | 1/2012 | Gupta et al. |
| 2004/0122868 A1 | 6/2004 | Chan et al. |
| 2004/0210563 A1 | 10/2004 | Zait et al. |
| 2004/0225666 A1 | 11/2004 | Hinshaw et al. |
| 2005/0013208 A1 | 1/2005 | Hirabayashi et al. |
| 2005/0114307 A1 | 5/2005 | Li et al. |
| 2005/0114311 A1 | 5/2005 | Cheng et al. |
| 2005/0187917 A1* | 8/2005 | Lawande et al. ............ 707/3 |
| 2005/0234971 A1* | 10/2005 | Folkert et al. ............ 707/102 |
| 2005/0235003 A1* | 10/2005 | Folkert et al. ............ 707/201 |
| 2005/0235004 A1* | 10/2005 | Folkert et al. ............ 707/201 |
| 2006/0047622 A1* | 3/2006 | Folkert et al. ............ 707/1 |
| 2006/0047696 A1 | 3/2006 | Larson et al. |
| 2006/0218128 A1 | 9/2006 | Muras |

OTHER PUBLICATIONS

Melnyk, Roman "DB2 Basics: An introduction to materialized query tables", IBM Canada Ltd., Sep. 7, 2005.

Lehner, Wolfgang et al., "fAST Refresh using Mass Query Optimization", Data Engineering, 2001, pp. 391-398.

Srivastava, Divesh et al., "Answering Queries with Aggregation Using Views", Proceedings of the 22nd VLDB (Very Large Data Base) Conference, 1996, 12 pages (see Section 3).

Zaharioudakis, Markos et al., "Answering Complex SQL Queries Using Automatic Summary Tables", ACM SiGMOD Record, vol. 29, Issue 2, Jun. 2000, pp. 105-116.

Embry, Michael et al., "Automated Summary Tables and Aggregate Navigation in DB2 Universal Database", The IDUG Solutions Journal, Fall 1999, vol. 6, No. 3.

\* cited by examiner

FIG. 1

| Predicate Expression | | | |
|---|---|---|---|
| Logical Expression | Relational Expression | Unary Expression | Boolean Expression |
| AND<br>OR<br>NOT<br>UNION | <<br>><br><=<br>>=<br><br>!= | isNull<br>isNotNull<br>exist<br>NotExist | TRUE<br>FALSE |

FIG. 2

Select * from Table1 where C1=4
AND (C2>6 OR C3!=8)

FIG. 3

C1=4 AND (C2>6 OR C3!=8)

AUTONOMIC REFRESH OF A MATERIALIZED QUERY TABLE IN A COMPUTER DATABASE

CROSS-REFERENCE TO RELATED APPLICATION

This patent application is a divisional of a patent application of the same title, U.S. Ser. No. 11/197,607 filed on Aug. 4, 2005, which is incorporated herein by reference.

BACKGROUND OF TIE INVENTION

1. Technical Field

This invention generally relates to computer database systems, and more specifically relates to apparatus and methods for autonomic refresh of a materialized query table in a computer database.

2. Background Art

Database systems have been developed that allow a computer to store a large amount of information in a way that allows a user to search for and retrieve specific information in the database. Data is typically stored in database tables. The tables contain columns and rows of data. The data in the table is related to or associated with other data in corresponding columns and rows. Relationships of the data are stored in indexes.

Retrieval of information from a database is typically done using queries. A database query typically includes one or more predicate expressions interconnected with logical operators. The database is searched for records that satisfy the query, and those records are returned as the query result. In database systems it is common for identical or closely related queries to be issued frequently. When a database contains very large amounts of data, certain queries against the database can take an unacceptably long time to execute. The cost of executing a query may be particularly significant when the query requires join operations among a large number of database tables.

It has become a common practice to store the results of often-repeated queries in database tables. By storing the results of queries, the costly join operations required to generate the results do not have to be performed every time the queries are issued. Rather, the database server responds to the queries by simply retrieving the pre-stored data. These stored results are sometimes referred to as a materialized views or materialized query tables (MQT). The purpose for the MQT is to provide an aggregation of data that can satisfy many subsequent queries without repeating the full access to the database.

As new data is periodically added to the base tables of a materialized query table, the materialized query table needs to be updated to reflect the new base table data. When a materialized query table accurately reflects all of the data currently in its base tables, the materialized query table is considered to be "fresh". Otherwise, the materialized query table is considered to be "stale". A stale materialized query table may be re-computed by various techniques that are collectively referred to as a "refresh". Some prior art systems use different modes to tolerate data staleness. For example, software may access the MQT in Enforced mode, Trusted mode, or Stale-Tolerated mode. When software accesses the data in Enforced mode, the data is required to be 100% accurate. If the MQT is not up to date when accessed in this mode, the data must be retrieved from the base tables rather than from the MQT. Retrieving the data from the base tables is more costly in system resources and in some cases may actually be more costly than updating the MQTs.

Without a way to update an MQT in an efficient manner, the computer industry will continue to suffer from inefficiency and poor database performance.

DISCLOSURE OF INVENTION

In accordance with the preferred embodiments, an apparatus and method provide autonomic refresh of an MQT in a computer database to improve database performance and utility. In preferred embodiments, the query optimizer autonomically initiates a refresh of an MQT depending on an estimated time for the query to access the base tables. In other preferred embodiments, the query optimizer estimates the time for the query to access the base tables and compares it to the estimated time to refresh the MQT to determine whether to refresh the MQT and run the query over the MQT rather than run the query over the base tables.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

1.0 Overview

The present invention relates to an apparatus and method to provide autonomic refresh of an MQT in a computer database to improve database performance and utility. For those not familiar with databases or queries, this Overview section provides background information that will help to understand the present invention.

Known Databases and Database Queries

There are many different types of databases known in the art. The most common is known as a relational database (RDB), which organizes data in tables that have rows that represent individual entries or records in the database, and columns that define what is stored in each entry or record.

In a broader view, data in a database system is stored in one or more data containers, where each container contains records, and the data within each record is organized into one or more fields. In relational database systems, the data containers are referred to as tables, the records are referred to as rows, and the fields are referred to as columns as described above. In object oriented databases, the data containers are referred to as object classes, the records are referred to as objects, and the fields are referred to as attributes. Other database architectures may use other terminology. While not intended to be limiting to relational databases, for the purpose of explanation, the examples and the terminology used herein shall be that typically associated with relational databases. Thus, the terms "table", "row" and "column" shall be used herein to refer respectively to the data container, record, and field and similarly apply to the other types of database containers. Retrieval of information from a database is typically done using queries. A database query is an expression that is evaluated by a database manager. The expression may contain one or more predicate expressions that are used to retrieve data from a database. For example, let's assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix.

Figure 2:
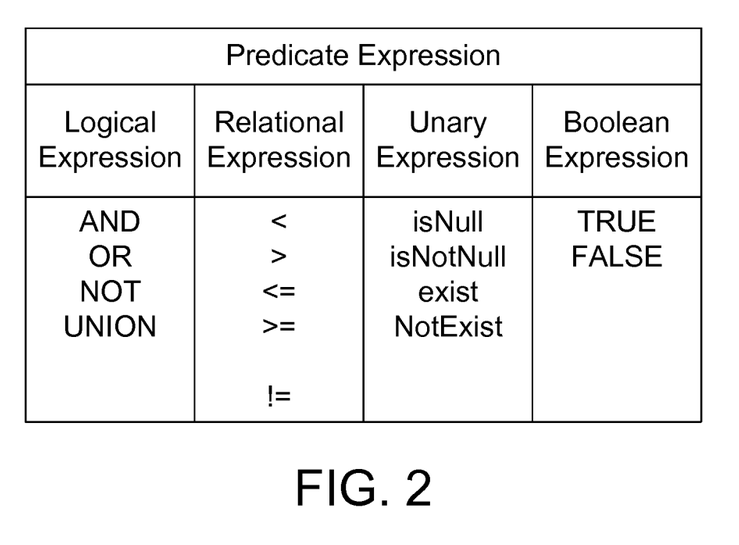
FIG. 2 is a table showing expressions that may be included in a predicate expression in a database query.

A database query typically includes one or more predicate expressions interconnected with logical operators. A predicate expression is a general term given to an expression using one of the four kinds of operators (or their combinations): logical, relational, unary, and boolean, as shown in FIG. 2. A query usually specifies conditions that apply to one or more columns of the database, and may specify relatively complex logical operations on multiple columns. The database is searched for records that satisfy the query, and those records are returned as the query result.

Figure 3:
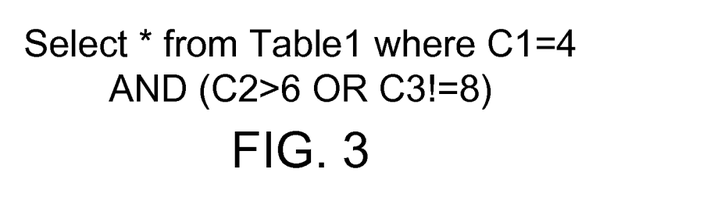
FIG. 3 is a sample database query in Structured Query Language (SQL)

One popular way to define a query uses Structured Query Language (SQL). SQL defines a syntax for generating and processing queries that is independent of the actual structure and format of the database. One sample SQL query is shown in FIG. 3. The SELECT statement tells the database query processor to SELECT all columns, the "from Table 1" clause identifies which database table to search, and the WHERE clause specifies one or more expressions that must be satisfied for a record to be retrieved. Note that the query of FIG. 3 is expressed in terms of columns C1, C2 and C3. Information about the internal storage of the data is not required as long as the query is written in terms of expressions that relate to values in columns from tables.

Figure 4:
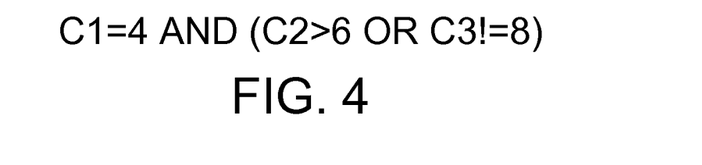
FIG. 4 is a predicate expression that is representative of the WHERE clause in the sample database query of FIG. 3.

For the query of FIG. 3, the WHERE clause specifies that the first column has a value equal to four (C1=4) logically ANDed with the expression that the second column is greater than six OR the third column is not equal to eight. The expression in the WHERE clause of FIG. 3 is shown in FIG. 4. Where not specifically stated herein, the term "expression" is intended to mean an arbitrary predicate expression, which can be an entire expression in a query, a portion of an expression in a query, or the entire query and may include logical expressions, relational expressions, unary expressions, boolean expressions, and their combinations.

In database systems it is common for identical or closely related queries to be issued frequently. To respond to such queries, the database server typically has to perform numerous join operations because the database records contain the information that is required to respond to the queries. When a database contains very large amounts of data, certain queries against the database can take an unacceptably long time to execute. The cost of executing a query may be particularly significant when the query (which takes the form of a "SELECT" statement in the SQL database language) requires join operations among a large number of database tables.

Materialized Query Tables

It has become a common practice to store the results of often-repeated queries in database tables or some other persistent database object. By storing the results of queries, the costly join operations required to generate the results do not have to be performed every time the queries are issued. Rather, the database server responds to the queries by simply retrieving the pre-stored data. These stored results are sometimes referred to as materialized views or materialized query tables (MQT). An MQT initially may be a computed result of a given query. The purpose for the MQT is to provide an aggregation of data that can satisfy many subsequent queries without repeating the full access to the database.

Typically, the query table definition is in the form of a database query, herein referred to as a materialized query. The materialized query is processed and the results are stored as the MQT. The results can be in the form of rows, which may be rows from a single base table or rows created by joining rows in the base table. Materialized query tables eliminate the overhead associated with gathering and deriving the data every time a query is executed. Through a process known as query rewrite, a query can be optimized to recognize and use existing materialized query tables that could answer the query. Typically, the query rewrite optimization is transparent to the application submitting the query. That is, the rewrite operation happens automatically and does not require the application to know about the existence of materialized query tables, nor that a particular materialized query table has been substituted in the original query.

Refreshing Materialized Query Tables

As new data is periodically added to the base tables corresponding to a materialized query table, the materialized query table needs to be updated to reflect the new base table data. When a materialized query table accurately reflects all of the data currently in its base tables, the materialized query table is considered to be "fresh". Otherwise, the materialized query table is considered to be "stale". A stale materialized query table may be re-computed by various techniques that are collectively referred to as a "refresh".

The data in the MQT is either system maintained in real time or is deferred until the user specifies to refresh the table. Deferring the refresh is sometimes referred to as deferred maintenance. Making the decision whether to maintain the MQT in real time or in some deferred fashion is usually a business decision based upon available resources and the need for accurate data. In many systems, keeping MQT's up to date is not viable so different methods are used to initiate a manual refresh of the data. In these prior art systems the refresh is under software control by the user. Some prior art systems use different modes to tolerate data staleness. For example, software may access the MQT in an Enforced mode, and one or more modes that tolerate some amount of data staleness.

When software accesses the data in Enforced mode, the data is required to be 100% accurate. If the MQT is not up to date when accessed in this mode, the data must be retrieved from the base tables rather than from the MQT. Retrieving the data from the base tables is more costly in system resources and in some cases may actually be more costly than updating the MQTs.

2.0 Detailed Description

The preferred embodiments herein provide an apparatus and method to autonomically refresh an MQT in a computer database. In preferred embodiments, the query optimizer autonomically initiates a refresh of an MQT depending on an estimated time for the query to access the base tables. In other preferred embodiments, the query optimizer estimates the time for the query to access the base tables and compares it to the estimated time to refresh the MQT to determine whether to refresh the MQT and run the query over the MQT rather than the base tables.

Figure 1:
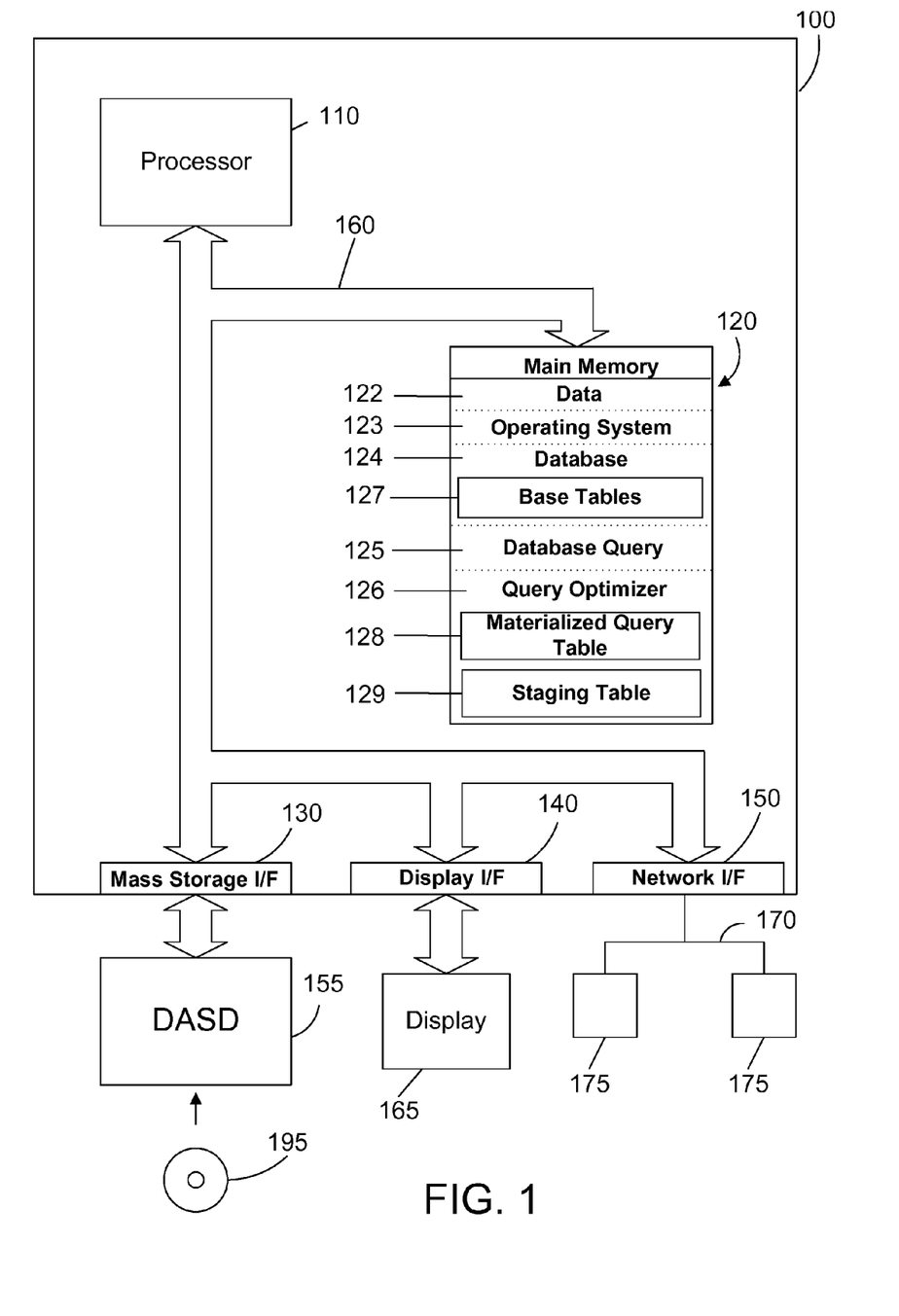
FIG. 1 is an apparatus in accordance with the preferred embodiments.

Referring now to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD RW drive, which may store data to and read data from a CD RW 195.

Main memory 120 in accordance with the preferred embodiments contains data 122, an operating system 123, a database 124, one or more database queries 125, and a database query optimizer 126. Data 122 represents any data that serves as input to or output from any program in computer system 100. Operating system 123 is a multitasking operating system known in the industry as i5/OS; however, those skilled in the art will appreciate that the spirit and scope of the present invention is not limited to any one operating system. Database 124 is any suitable database, whether currently known or developed in the future. Database 124 includes one or more base tables 127 as described further below. Database query 125 is a query in a format compatible with the database 124 that allows information stored in the database 124 that satisfies the database query 125 to be retrieved. Database query optimizer 126 optimizes a query 125 and produces an access plan used by a database manager in the database 124 to access the database. Database query optimizer 126 includes a Materialized Query Table (MQT) 128 that is autonomically updated by the query optimizer 126 in accordance with the preferred embodiments. Database query optimizer 126 further includes a staging table 129 that is used by the query optimizer 126 in accordance with the preferred embodiments. The staging table temporarily stores data from queries that affect the MQT until the next update of the MQT is performed. The rows in the staging table are processed one at a time and removed from the staging table as they are used to update the MQT.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 123, database 124, database query 125, and the database query optimizer 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 123. Operating system 123 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD RW (e.g., 195 of FIG. 1), and transmission type media such as digital and analog communications links. Note that the preferred signal bearing media is tangible.

The preferred embodiments herein provide an apparatus and method to autonomically refresh an MQT in a computer database. In preferred embodiments, the query optimizer 126 autonomically initiates a refresh of an MQT 128 depending on an estimated time for the query to access the base tables 127. In preferred embodiment, the query optimizer 126 parses through pending queries that require non-stale data to find those queries that have a corresponding MQT 128. If the MQT is in deferred maintenance then the query optimizer 126 proceeds to determine if it is economical to update the MQT prior to executing the query.

To determine if it's economical to update the MQT, the query optimizer 126 first needs to estimate the time to update the MQT. In order to estimate the time to update the MQT, the query optimizer gets the query associated with the MQT and operates on them to estimate the run time of the computer to update the MQT. The estimation is done in the same way as prior art techniques to estimate the time for a query. The estimation process is described further below. In some embodiments, the query optimizer also needs to retrieve the count of results in the staging table 129 and include this in making the time estimate to update the MQT. When MQT's are in a deferred mode, changes that would be made to an MQT because of changes in the base tables are put into a staging table. Therefore when the optimizer tries to estimate how much time will be required to update the MQT, the time to run the queries against the staging table will also need to be estimated.

To proceed to determine if its economical to update the MQT, the query optimizer 126 compares the estimated time to update the MQT with an estimate of the time to execute the query. If the update time is greater than the query execution time then the query optimizer 126 proceeds to update the MQT. Of course it would be obvious to those skilled in the art that other comparisons could also be made. For example the update may proceed if the MQT update time is some ratio of the execution time.

In the process to determine if its economical to update the MQT, the query optimizer 126 may also estimate if the time to update the MQT is greater than the time for processing the query including trigger events. A trigger event is a query that will spawn or may spawn other queries to execute. In the case of a trigger event, the query optimizer 126 would also consider the cumulative time in estimating the time to perform the queries as compared to the time to update the MQT.

Figure 9:
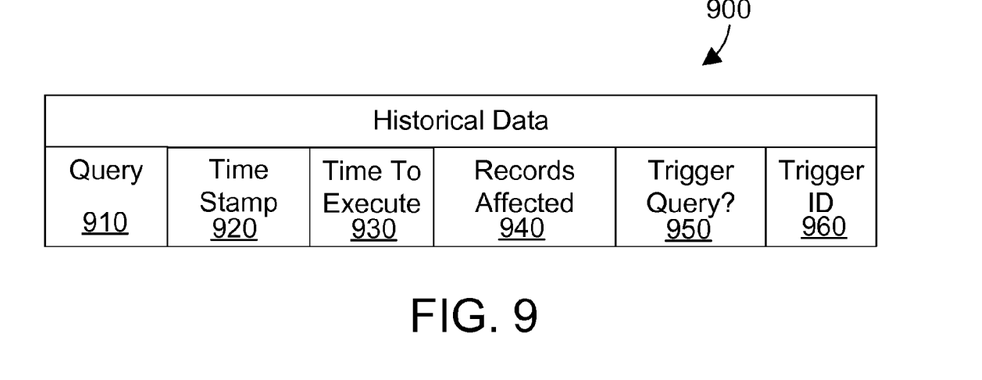
FIG. 9 shows an example of historical data that is maintained by the query optimizer according to preferred embodiments.

The process to estimate the time to update the MQT is performed similar to prior art techniques to estimate the time for running a query. The estimation process according to preferred embodiments uses historical data from previous queries to more accurately estimate the time to update the MQT. FIG. 9 shows an example of a historical data record 900. A historical data record 900 is stored for queries corresponding to an MQT. The data that is stored in the historical record includes a copy of the query or an appropriate query identifier 910, a time stamp 920, the time for the query to execute 930, the number of records affected by the query 940, a trigger query status 950, and a trigger ID 960.

The time stamp 920 shown in FIG. 9 records when a query was executed by the computer. The time stamp can be used as a means to identify if a query is part of a sequence of queries associated with a trigger query. The historical data and the time stamp can be examined by the optimizer to identify queries that execute proximate to each other in time. Other means could also be used to identify a trigger query such as identifying queries that are called by the same application program.

Again referring to the historical data record fields in FIG. 9, when a query is executed, the start time and stop time are noted to determine the time to execute the query 930. The number of records affected 940 by the query can also be used to estimate future update times. The "Trigger Query?" field 950 holds a true or false value to indicate whether the query has been identified as a trigger query. The trigger query ID 960 holds a value to identify the query as being associated with a trigger query. The trigger query ID 960 would be the same for all queries that are associated with an identified trigger query. Thus, a trigger ID ties a sequence of queries together into a block that can be used to estimate the time to update the MQT.

Figure 5:
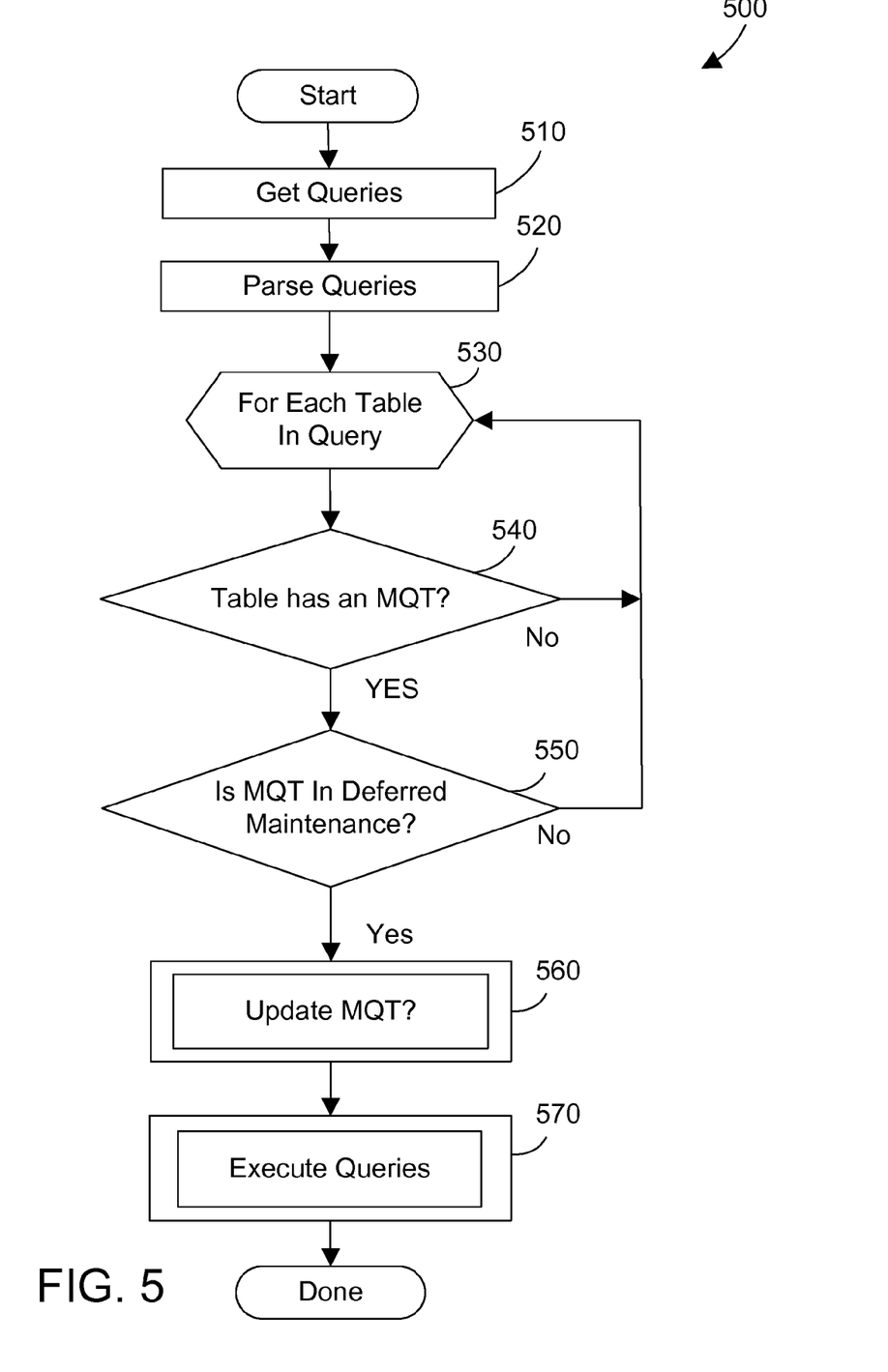
FIG. 5 is an example flow diagram according to preferred embodiments.

Referring now to FIG. 5, a flow diagram shows a method 500 for autonomically refreshing an MQT according to a preferred embodiment. The method 500 is presented as a series of steps performed by a computer software program described above as a query optimizer 126. The query optimizer gets one or more queries that require non-stale data from software operating on the computer system (step 510). The query optimizer parses through pending queries to determine what tables are referenced in the queries (step 520). For each table referenced in the queries the query optimizer performs the following two steps to determine whether there are MQT tables that are candidates to be updated (step 530). The query optimizer first checks to see if the table has a corresponding MQT (step 540). If there is no corresponding MQT for this table (step 540=no) then the query optimizer proceeds to the next table. If there is a corresponding MQT for this table (step 540=yes) then the query optimizer proceeds to the next step. The query optimizer then checks if the MQT for the current table is in deferred maintenance (step 550). If the MQT is not in deferred maintenance (step 550=no), the MQT does not need to be updated and the query optimizer proceeds with the next table (step 530). If the MQT is in deferred maintenance (step 550=yes), the MQT is a candidate to be updated and the query optimizer proceeds to determine if it is economical to update the MQT (step 560 and described further below with respect to method 560 in FIG. 6) prior to executing the query (step 570 and described further below with respect to method 570 in FIG. 8).

Figure 6:
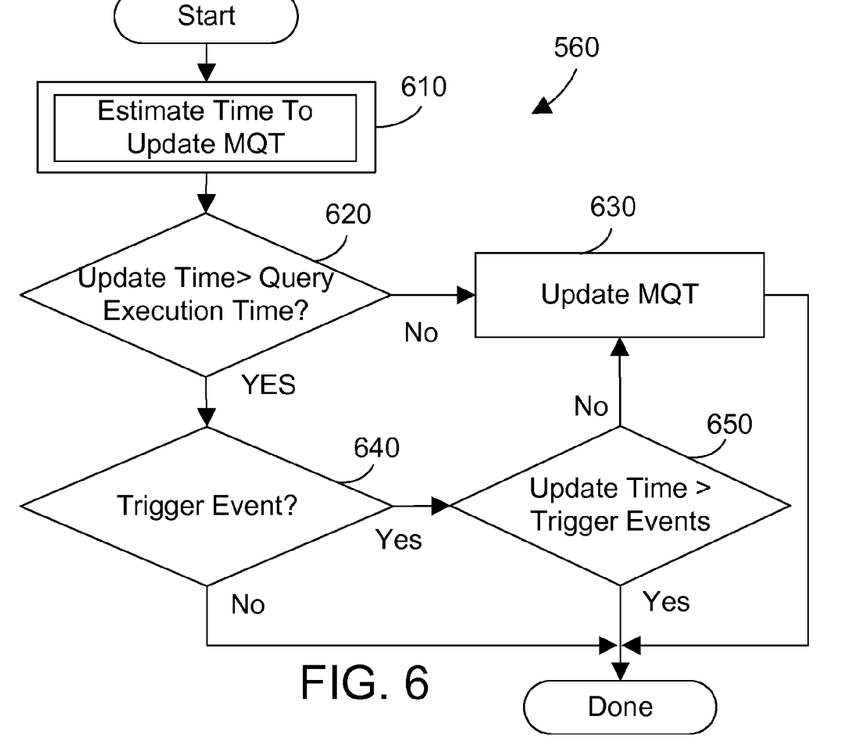
FIG. 6 is an example flow diagram according to preferred embodiments.

Referring now to FIG. 6, a flow diagram shows a method 560 which describes a representative method for step 560 in FIG. 5. Method 560 is a method to determine if it is economical to update the MQT according to a preferred embodiment. To determine if its economical to update the MQT, the query optimizer 126 first needs to estimate the time to update the MQT (step 610 and described further below with respect to method 610 in FIG. 7). The estimated time to update the MQT is compared to the estimated query execution time that is also determined by the query optimizer (step 620). If the time to update the MQT is not greater than the time for execution of the query (step 620=no) then the MQT is updated (step 630). If the time to update the MQT is greater than the time for execution of the query (step 620=yes) the query historical record is checked to determine if there is a trigger event associated with the query (step 640). In the case of a trigger event, the query optimizer 126 would also consider the cumulative time in estimating the time to perform the queries as compared to the time to update the MQT. If there is no trigger event (step 640=no) then the method is done. If there is a query event (step 640=yes) then the estimated time to update the MQT is compared to the estimated time to execute the query including the trigger events (step 650). If the estimated time to update the MQT is not greater than the estimated time to execute the query including the trigger events (step 650=no) then the MQT is updated (step 630) and the method is then done. If the estimated time to update the MQT is greater than the estimated time to execute the query including the trigger events (step 650=yes) then the MQT is not updated and the method done.

Figure 7:
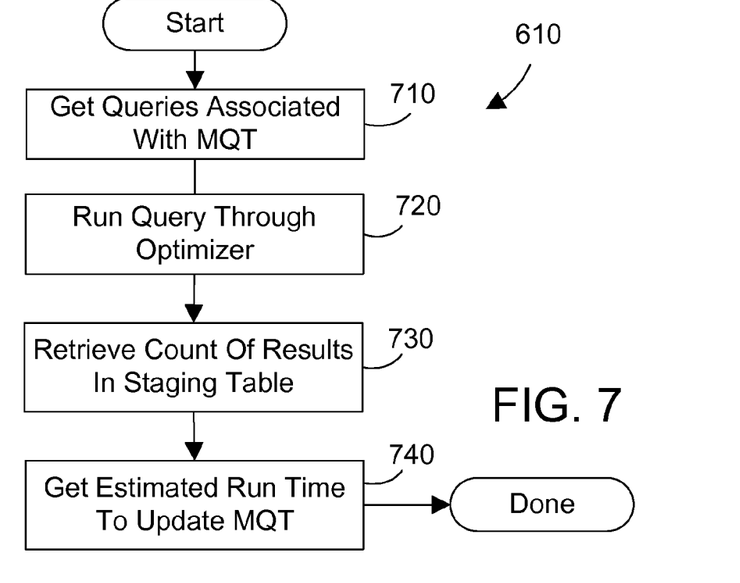
FIG. 7 is an example flow diagram according to preferred embodiments.

Referring now to FIG. 7, a flow diagram shows a method 610 to estimate the time to update the MQT according to a preferred embodiment, which is one suitable implementation of step 610 in FIG. 6. In order to estimate the time to update the MQT, the query optimizer gets the queries associated with the MQT (step 710). The query optimizer then operates on the queries to estimate the run time of the computer to update the MQT (step 720). The query optimizer where applicable also needs to retrieve the count of results in the staging table and include this in making the time estimate to update the MQT (step 730). The query optimizer then produces an estimate of how much time is needed to update the MQT (step 740).

Figure 8:
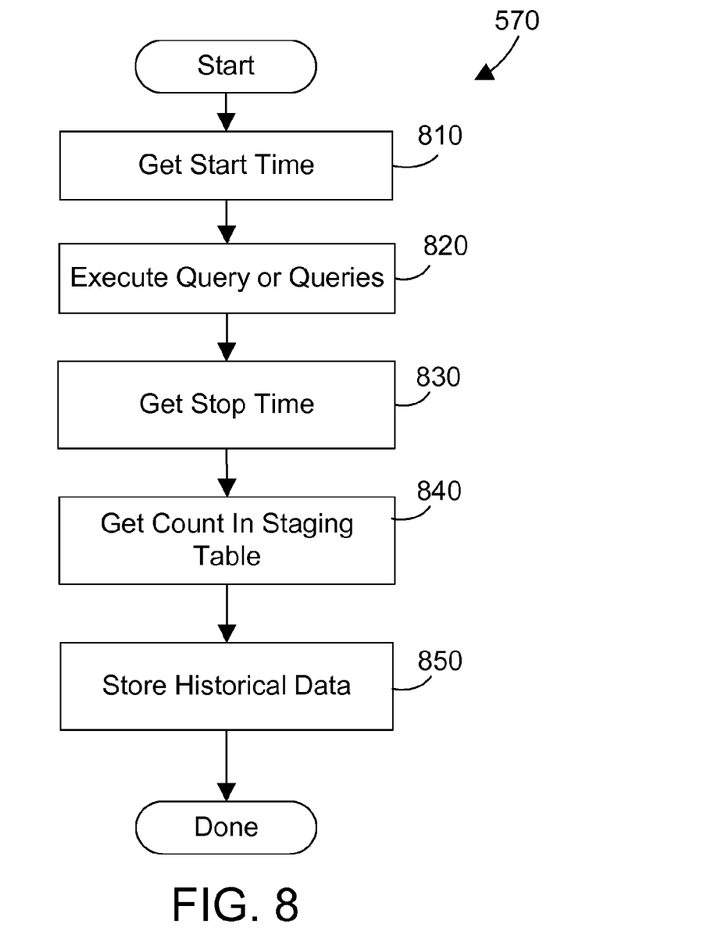
FIG. 8 is another flow diagram illustrating a method according to the preferred embodiments.

Referring now to FIG. 8, a flow diagram shows a method 570 to create a historical record of the times to update the MQT according to a preferred embodiment which is one suitable implementation of step 570 in FIG. 5. The method first gets the start time (step 810), prior to executing the query (step 820). The query is executed in the manner known in the prior art. After completing the execution of the query, the method then gets the stop time (step 830). The start time and stop time are relative time marks that are typically available to the computer processor. The start time and stop time are then used to compute a time 930 to execute the query, which is stored in the historical data record 900 described above with reference to FIG. 9. The method also retrieves the record count of records that are pending in the staging table (step 840) for the executed query. The accumulated data is then stored in the historical data record (step 850).

The present invention as described with reference to the preferred embodiments provides significant improvements over the prior art. An apparatus and method provide autonomic refresh of an MQT in a computer database. The present invention provides a way to reduce database query time to improve system performance, and reduce excessive delays in database accesses.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A method for a refreshing a materialized query table (MQT) in a database, the method comprising the steps of:
    parsing a query to identify a database table with a MQT in deferred maintenance;
    determining whether to update the MQT in deferred maintenance to execute the query by performing the steps of:
        estimating a time to execute the query over a base table corresponding to the MQT in deferred maintenance;
        estimating a time to update the MQT in deferred maintenance;
        comparing the estimated time to update the MQT in deferred maintenance and the estimated time to execute the query over the base tables;
        updating the MQT in deferred maintenance where the estimated time to update the MQT is less than the time to execute the query; and
        executing the query over the now updated MQT in deferred maintenance.

2. The method of claim 1 further comprising the step of considering time of trigger events to estimate the time for a query to access the data.

3. The method of claim 1 further comprising the step of considering results stored in a staging table to estimate the time to refresh the MQT.

* * * * *